United States Patent [19]

Jie et al.

[11] Patent Number: 5,841,985
[45] Date of Patent: Nov. 24, 1998

[54] METHOD AND APPARATUS FOR SUPPORTING MULTIPLE PROTOCOLS ON A NETWORK

[75] Inventors: Ni Jie, Beaverton; David Chalupsky, Banks, both of Oreg.

[73] Assignee: Intel Corporation, Santa Clara, Calif.

[21] Appl. No.: 715,651

[22] Filed: Sep. 18, 1996

[51] Int. Cl.$^6$ .................................................. H04J 3/22
[52] U.S. Cl. ........................... 395/200.57; 395/200.38; 395/200.6; 370/468
[58] Field of Search .......................... 395/200.3, 200.38, 395/200.39, 200.57, 200.6; 370/468

[56] References Cited

U.S. PATENT DOCUMENTS

| 5,442,629 | 8/1995 | Geyer et al. | 370/252 |
| 5,444,712 | 8/1995 | Betts et al. | 370/110.1 |
| 5,596,575 | 1/1997 | Yang et al. | 370/468 |
| 5,655,140 | 8/1997 | Haddock | 395/200.76 |
| 5,666,359 | 9/1997 | Bennett et al. | 370/358 |

OTHER PUBLICATIONS

Crayford, "'Fast Ethernet' Gets Plug–and–Play", WESCON/95: Conference Record, pp. 354–359, 1995.
IEEE Standard 802.3u–1995 Autonegotiation Scheme.

Primary Examiner—Alyssa H. Bowler
Assistant Examiner—Walter D. Davis, Jr.
Attorney, Agent, or Firm—Blakely, Sokoloff, Taylor & Zafman

[57] ABSTRACT

A circuit to control a network interface includes a first interface circuit and a second interface circuit. The first interface circuit is capable of negotiating one protocol to use from a plurality of known interface protocols. The first interface circuit controls the network interface when the negotiated interface protocol is supported by the first interface circuit. Otherwise, if the second interface circuit supports the negotiated protocol, the first interface circuit releases control of the network interface to the second interface circuit. The first interface circuit takes control of the network interface from the second interface circuit when the second interface circuit signals the first interface circuit that reliable communication with the network has been lost.

16 Claims, 2 Drawing Sheets

METHOD AND APPARATUS FOR SUPPORTING MULTIPLE PROTOCOLS ON A NETWORK

BACKGROUND

1. Field of the Invention

The invention applies to the field of interface circuits for computer networks. The invention is particularly applicable to the field of 100 Mbit fast Ethernet network interfaces.

2. Art Background

Currently, there are two predominant physical layer protocols for 100 Mbit fast Ethernet interfaces:

1) 100 Base TX (TX). The TX protocol applies to a type of network cable known as Category 5 cable, consisting of two twisted pairs of wires.

2) 100 Base T4 (T4). The T4 protocol applies to a type of network cable known as Category 3 cable, consisting of four twisted pairs of wire. Category 3 cable is generally less expensive than Category 5 cable, but suffers from greater signal degradation over distance.

It is currently unclear whether T4 or TX will emerge as the leading protocol standard for fast Ethernet. Ethernet interface circuits should determine which type of protocol is used by the computer network to which they are connected. The IEEE standard 802.3u Autonegotiation Scheme specifies a means by which an interface circuit can determine whether the computer network supports a protocol compatible with the circuit. According to the standard, when a circuit is connected to the network, it broadcasts which protocol it supports, and other devices on the network acknowledge support for the protocol or not. If the circuit and the network do not support the same protocol, the circuit cannot exchange data over the network.

It would be desirable for a network interface circuit to support multiple network protocols, so that a customer could buy the product incorporating the circuit without regard to which protocol the network supports. To simplify the design, manufacture, and extensibility of the circuit, each of multiple protocols should be supported by the circuit in a modular fashion.

SUMMARY OF THE INVENTION

A circuit to control a network interface includes a first interface circuit and a second interface circuit. The first interface circuit is capable of negotiating one protocol to use from a plurality of known interface protocols. The first interface circuit controls the network interface when the negotiated interface protocol is supported by the first interface circuit. Otherwise, if the second interface circuit supports the negotiated protocol, the first interface circuit releases control of the network interface to the second interface circuit.

DETAILED DESCRIPTION

In the following description, numerous specific details are set forth such as circuits, flow diagrams, etc., in order to provide a thorough understanding of the present invention. In other instances, well-known structures and techniques have not been shown in detail because to do so would unnecessarily obscure the present invention. The specific arrangements and methods described herein are merely illustrative of the principles of the present invention. Numerous modifications in form and detail may be made by those of ordinary skill in the art without departing from the scope of the present invention. For example, the invention may be applied to any network interface and is not limited to fast Ethernet networks.

The invention involves circuitry to analyze the protocol supported by a connected network, using autonegotiation. The circuitry adapts its protocol according to the protocol supported by the network. In one embodiment, the invention uses two distinct circuits, the first circuit supporting the TX protocol, the second supporting the T4 protocol. The circuits cooperate in a manner which allows one or the other to control the interface to the network, depending on the protocol used by the network.

In one embodiment, the T4 circuit acts as a master when controlling the interface, and the TX circuitry acts in a slave capacity. However, in general either circuit can act as a master or a slave. For example, asserting a signal on a slave pin on the T4 circuit may cause it to act as a slave, while deasserting the slave pin on the TX circuit may cause it to act as a master.

Figure 1:
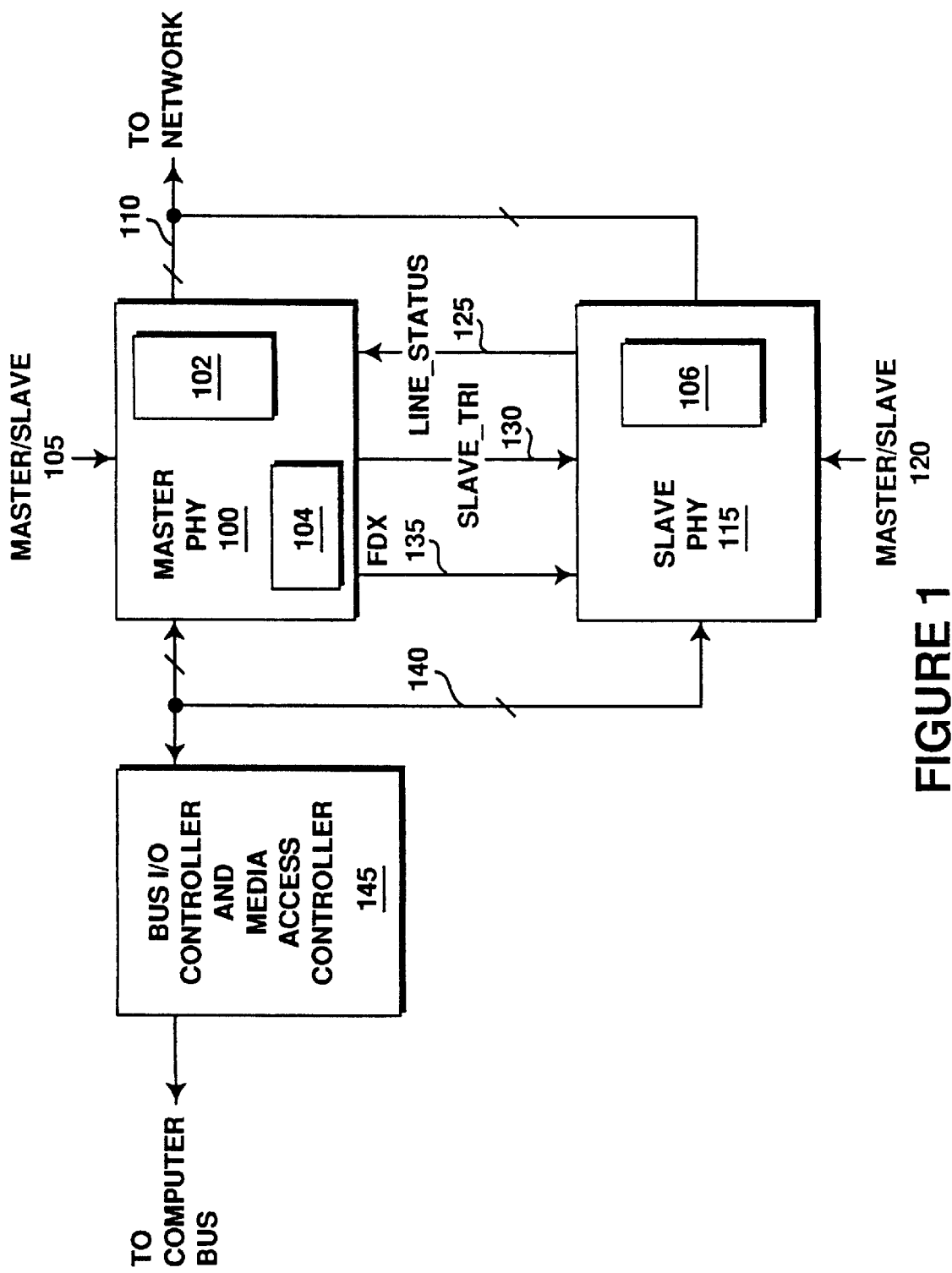
FIG. 1 is a block diagram in accordance with the present invention for interfacing to computer networks using different physical layer protocols.

FIG. 1 shows a circuit for interfacing to different computer networks using different physical layer protocols. The master circuit 100 and the slave circuit 115 are coupled to the network by way of a network interface bus 110, and are coupled to the bus controller 145 by way of interface bus 140. The master circuit 100 and slave circuit 115 are also coupled to one another by way of the signaling paths 135, 130, and 125. Signal path 135 carries a signal FDX, signal path 130 carries a signal SLAVE_TRI, and signal path 125 carries a signal LINK_STATUS. The bus controller 145 is coupled to the computer bus, and is used to exchange data over the bus with a computer system. The bus controller also acts as a media access controller (MAC) for the network, providing framing and collision resolution functions, for example. For example, on an Ethernet network, the bus controller/MAC 145 supports the CSMA/CD protocol.

Application of the master/slave signal on lines 105 and 120 causes the associated circuit to behave as a master. In the figure, the signal on line 105 is for example high, and the signal on line 120 is low, causing the master/slave relationship denoted in the figure. The master/slave relationship is typically fixed for a particular installation, by for instance permanently attaching package terminals to the appropriate signal level.

The master circuit 100 advertises to the network the protocol supported by the master 100 and the protocol supported by the slave 115. If the network indicates support for the protocol supported by the master 100, the master 100 controls the interface and the slave 115 remains passive. If the network indicates support for the protocol supported by the slave circuit 115, the master 100 relinquishes control of the interface to the slave circuit 115, and the master 100 becomes passive. The master circuit 100 disables the slave circuit 115 by asserting the SLAVE_TRI signal on path 130, and then proceeds to transmit and receive data over the interface using the protocol supported by the master 100. During negotiation of the supported protocol by the master circuit 100, SLAVE_TRI signal on path 130 is asserted, so that the master circuit 100 need not do anything to maintain control of the interface.

When the master 100 relinquishes control to the slave 115, it disables its use of the network interface 110 and the interface 140 to bus controller 145. It disables these interfaces by placing its connections to these interfaces in a high impedance state that neither drives the interfaces nor loads them. Likewise, when the master 115 relinquishes control to the slave 100, it disables its use of the network interface 110 and the interface 140 to bus controller 145. Like the master 100, the slave disables these interfaces by placing its connections to these interfaces in a high impedance state that neither drives the interfaces nor loads them.

The master circuit 100 relinquishes control of the interface to the slave circuit 115 by deasserting the SLAVE_TRI signal on path 130 and disabling itself. While disabled, the master 100 monitors the LINK_STATUS signal on path 125, which indicates the status of the network link. When the LINK_STATUS signal is asserted, it indicates that the slave circuit 115 has a good link with the network. If this signal is ever deasserted by the slave 115, it means that the link has gone bad. In this circumstance, the master circuit 100 must re-take control of interface from the slave 115 and renegotiate a supported protocol. This situation might occur, for example, when the network cable is temporarily disconnected from the interface, then reconnected at a later time.

Some network protocols may be capable of supporting full duplex data exchange. For example, the TX protocol supports full duplex. The T4 protocol does not support full duplex data exchange. If the master circuit 100 determines through negotiation that the network supports a full duplex protocol, then it asserts the FDX signal on path 135 to indicate to the slave 115 to perform full duplex. Otherwise, the FDX signal on path 135 is not asserted.

The master circuit 100 and the slave circuit 115 are coupled to a bus controller 145 by way of a bus controller interface 140. In one embodiment, the interface 140 is defined by the Media Independent Interface Standard 802.3u. This coupling is used by the bus controller 145 to read data received from the network by the currently enabled interface circuit (either the master 100 or the slave 115), or to write data from the bus controller 145 to the currently enabled interface circuit for transmission over the network. The bus controller 145 can be any type and may consist of a PCI bus controller, an ISA bus controller, or an EISA controller. The invention is not limited to any particular coupling between the interface circuits and the bus controller, and embodiments other than the Standard 802.3u may be used without departing from the scope of the invention.

The invention is also useful for implementing a 'parallel detection' mechanism as described in the Standard 802.3u. Using parallel detection as defined in the standard, each interface circuit monitors the network interface 110 in parallel, listening for a digital signature identifying compatible devices on the network. For example, both the interface supporting TX and the interface supporting T4 can monitor the network interface 110 in parallel, listening respectively for the signature of a TX or T4 device on the network with which they are compatible. When a network interface circuit detects a compatible device, it takes control of the network interface 110, terminating the pending autonegotiation, if necessary. Unfortunately, because of different electrical characteristics, TX interface circuits and T4 interface circuits may encounter difficulties in sharing the network interface 110 for parallel detection. To solve this sharing problem, all parallel detection logic 104 for each interface circuit is implemented within the master circuit 100. This eliminates the need for multiple interface circuits to share the network interface 110 simultaneously during parallel detection. The master circuit 100, upon detecting the signature of a supported device using the parallel detection logic 104, terminates autonegotiation and enables the appropriate interface circuit.

Other embodiments are possible without departing from the scope of the invention. For example, the signal on path 105 and the signal on path 120 are unnecessary for the practice of the invention. When these signals are omitted, the master circuit 100 and the slave circuit 115 are simplified because they need not be designed for dual modes of operation as both master and slave. In the figure, the TX and T4 circuits are shown as discrete packages. In general the circuits could be subsections within a single package. Also, the invention is not limited to supporting two protocols. Support for a third protocol, fourth protocol, and so on can be added in the following manner:

The master circuit 100 initially controls the interface. It negotiates to determine the protocol used by the network.

A bus carries the SLAVE_TRI signal over a path between the master circuit 100 and multiple slave circuits. The SLAVE_TRI signal selects the particular slave circuit which supports the protocol negotiated by the master circuit 100.

The LINK_STATUS signal is carried by a shared connection between all of the slave circuits and the master circuit. When the network link is lost, the slave circuit which controls the interface asserts the LINK_STATUS signal, causing the master 100 to re-take control of the interface and re-negotiate the connection.

The FDX signal is a shared signal between all of the slave circuits and the master circuit 100. When the master circuit 100 determines that the network protocol supports full duplex, it asserts FDX, and the slave circuit selected by SLAVE_TRI uses full duplex to exchange data.

Figure 2:
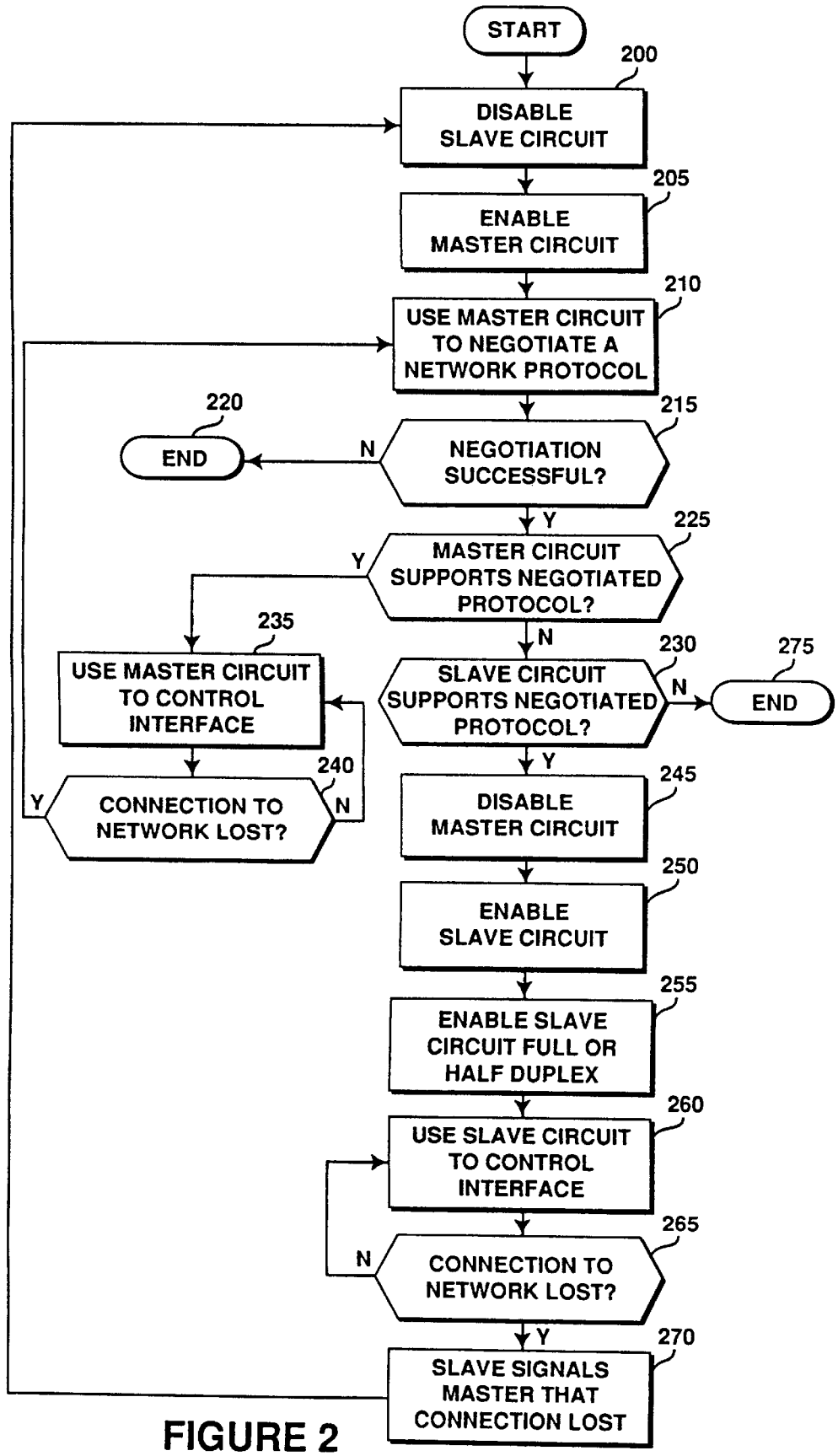
FIG. 2 illustrates the steps of a method for using a master/slave circuit arrangement to control a network interface which supports one of a plurality of physical network protocols as taught by the present invention.

FIG. 2 illustrates a method for using a master/slave circuit arrangement to control a network interface which supports one of a plurality of physical network protocols.

At step 200 the slave circuit is disabled. After disabling the slave circuit, the next step is to enable the master circuit 205. The master circuit is then used to negotiate a network protocol at step 210. At step 215, it is determined whether the negotiation was successful or not. If the negotiation was not successful, then the method ends at step 220. If the negotiation was successful, it is determined whether the master circuit supports the negotiated protocol at step 225. If the master circuit supports the negotiated protocol, the master circuit is used to control the network interface at step 235. A determination is then made at step 240 as to whether or not the connection to the network has been lost. If the connection is lost, the master circuit is used to re-negotiate a network protocol at step 210. If the connection is not lost, the master circuit will continue to be used to control the interface at step 235.

At step 230 a determination is made as to whether the slave circuit supports the negotiated protocol. If the slave circuit supports the negotiated protocol, the master circuit is disabled at step 245. If the slave circuit does not support the negotiated protocol, then the method ends at step 275 because neither the master nor the slave circuit support the negotiated protocol.

After disabling the master circuit, the next step is to enable the slave circuit 250, and subsequently enabling full or half duplex operation of the slave circuit at step 255. At step 265, a determination is made as to whether or not the connection to the network has been lost. If the connection is lost, the slave signals the master that the connection is lost at step 270, and the method proceeds to step 200 to re-attempt the negotiation. If the connection is not lost, the slave circuit will continue to be used to control the interface at step 260.

Although this invention has been shown in relation to a particular embodiment, it should not be considered so limited. Rather, the invention is limited only by the scope of the appended claims.

What is claimed is:

1. A circuit to control a network interface comprising:
   a first interface circuit, connectable with a network, including first interface logic to (i) negotiate an interface protocol from at least one of a plurality of supported interface protocols, (ii) control the network interface when the negotiated interface protocol is a first supported interface protocol, and (iii) release control of the network interface when the negotiated interface protocol is a second supported interface protocol; and
   a second interface circuit, coupled to the first interface circuit and connectable with the network, including second interface logic (i) to control the network interface when the negotiated interface protocol is the second supported interface protocol, the second interface logic being enabled by the first interface logic when the negotiated interface protocol is the second supported interface protocol and (ii) to release control of the network interface to the first interface logic when reliable communication with the network has been lost.

2. The circuit of claim 1 in which the first supported interface protocol is TX and the second supported interface protocol is T4.

3. The circuit of claim 1 in which the first supported interface protocol is T4 and the second supported interface protocol is TX.

4. The circuit of claim 1 in which the first interface logic signals the second interface logic to use full or half duplex for the second interface protocol.

5. The circuit of claim 1 in which the first interface circuit further comprises parallel detection logic for the first and second interface protocols.

6. A method of controlling a network interface, the method comprising the steps of:
   determining a negotiated network protocol from one of a plurality of supported network protocols using a first circuit, the first circuit supporting a first protocol of the plurality of supported network protocols;
   using the first circuit to control the network interface, when the negotiated protocol is the first protocol;
   controlling the network interface with a second circuit and disabling the first circuit when the negotiated protocol is a second protocol of the plurality of supported network protocols, the second circuit supporting the second protocol;
   disabling the second circuit when the first circuit controls the network interface and while the first circuit determines the negotiated protocol; and
   using the first circuit to take control of the network interface from the second circuit when the second circuit signals the first circuit that reliable communication with the network has been lost.

7. The method of claim 6 in which the first supported protocol network is TX and the second supported network protocol is T4.

8. The method of claim 6 in which the first supported protocol network is T4 and the second supported network protocol is TX.

9. The method of claim 6 further comprising the steps of:
   using the first circuit for parallel detection of a device on the network supporting either the first or second network protocol;
   using the first circuit to control the network interface when a device supporting the first interface protocol is detected; and
   controlling the network interface with the second circuit and disabling the first circuit when a device supporting the second interface protocol is detected.

10. The method of claim 6 further comprising the step of:
    the first circuit signaling the second circuit to use full or half duplex for the second network protocol.

11. A circuit to control a network interface comprising:
    first interface control means, connectable with a network, for negotiating a negotiated interface protocol from a plurality of supported interface protocols, the first interface control means for controlling the network interface when the negotiated interface protocol is a first supported interface protocol, the first interface control means for releasing control of the network interface when the negotiated interface protocol is a second supported interface protocol; and
    a second interface control means, coupled to the first interface control means and connectable with the network, for controlling the network interface when the negotiated interface protocol is the second supported interface protocol, the second interface control means being enabled by the first interface control means when the negotiated interface protocol is the second supported interface protocol, the second interface control means releasing control of the network interface to the first interface control means when the second interface control means signals the first interface control means that reliable communication with the network has been lost.

12. The circuit of claim 11 in which the first interface control means further comprises parallel detection logic for the first and second interface protocols.

13. The circuit of claim 11 in which the first supported interface protocol is TX and the second supported interface protocol is T4.

14. The circuit of claim 11 in which the first supported interface protocol is T4 and the second supported interface protocol is TX.

15. The circuit of claim 11 in which the first interface control means signals the second interface control means to use full or half duplex for the second interface protocol.

16. A circuit to control a network interface comprising:
    a first interface circuit, connectable with a network, including first interface logic to (i) negotiate an interface protocol from at least one of a plurality of supported interface protocols, (ii) control the network interface when the negotiated interface protocol is a first supported interface protocol, (iii) release control of the network interface when the negotiated interface protocol is a second supported interface protocol, and (iv) signal the second interface logic to use full or half duplex for a second interface protocol;
    a second interface circuit, coupled to the first interface circuit and connectable with the network, including second interface logic to control the network interface when the negotiated interface protocol is the second supported interface protocol, the second interface logic being enabled by the first interface logic when the negotiated interface protocol is the second supported interface protocol.

* * * * *